(12) United States Patent
McKenzie et al.

(10) Patent No.: US 6,414,814 B1
(45) Date of Patent: Jul. 2, 2002

(54) METHOD AND APPARATUS FOR MINIMIZING ONCE PER REVOLUTION POSITIONAL ERRORS IN SINGLE DISC SERVO TRACK WRITING

(75) Inventors: Lealon R. McKenzie, Edmond, OK (US); Robert D. Murphy, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/401,877

(22) Filed: Sep. 23, 1999

Related U.S. Application Data

(60) Provisional application No. 60/101,898, filed on Sep. 25, 1998.

(51) Int. Cl.$^7$ ................................................ G11B 5/596
(52) U.S. Cl. ...................................... 360/77.03; 360/40
(58) Field of Search .......................... 360/77.03, 77.04, 360/78.11, 75; 369/44.32, 44.28; 33/645, 551; 414/935

(56) References Cited

U.S. PATENT DOCUMENTS

| | | | | |
|---|---|---|---|---|
| 3,716,845 A | * | 2/1973 | Chaffin, III | 369/44.28 |
| 3,974,524 A | * | 8/1976 | Griffiths et al. | 360/75 |
| 5,442,172 A | * | 8/1995 | Chiang et al. | 250/237 G |
| 5,553,086 A | * | 9/1996 | Sompel et al. | 371/47.1 |
| 6,301,797 B1 | * | 10/2001 | Sundaram et al. | 33/645 |

* cited by examiner

Primary Examiner—David Hudspeth
Assistant Examiner—K. Wong
(74) Attorney, Agent, or Firm—Merchant & Gould, P.C.

(57) ABSTRACT

A method for minimizing once per revolution (OPR) positional errors in a single disk servo track writer (STW) comprises clamping a disc having an outer edge in the servo track writer; spinning the disc in the servo track writer at a predetermined speed; measuring distance from the disc edge to a predetermined point to determine peak to peak once per revolution positional error; determining an average once per revolution positional error from the peak to peak once per revolution positional error; and setting a reference position for writing servo tracks on the disc equal to a predetermined track reference plus the average once per revolution positional error. The servo track writer apparatus comprises a spindle motor for supporting and rotating a disc and a distance sensor such as an interferometer mounted a preset distance from the edge of the disc for measuring the once per revolution outer diameter positional error.

14 Claims, 3 Drawing Sheets

METHOD AND APPARATUS FOR MINIMIZING ONCE PER REVOLUTION POSITIONAL ERRORS IN SINGLE DISC SERVO TRACK WRITING

RELATED APPLICATIONS

This application is related to U.S. patent application Ser. No. 09/401,895, 1/40046.30-US-U2, filed on Sep. 23, 1999 and claims the benefit of the filing date of U.S. Provisional Patent Application Ser. No. 60/101,898 filed Sep. 25, 1998 and entitled "MINIMIZING OPR DURING SINGLE DISK STW".

FIELD OF THE INVENTION

This application generally relates to hard disc drives and more particularly to an apparatus and method for optimizing a servo track writing process in which servo tracks are separately written on each disc a single disc at a time.

BACKGROUND OF THE INVENTION

In a hard disc drive magnetic data storage device, servo data and user data are magnetically written and read from magnetic tracks laid out on an upper and/or lower surface layer deposited on a flat rotating disc in the drive. Accurate location of the tracks and accurate positioning of the read/write heads carried by an actuator assembly is critical to the optimal operation of these drives. The concentricity of the tracks with respect to the rotational center of the drive motor spindle is paramount to facilitating closer and closer track spacing as the demands for higher densities of data storage increase with each generation of disc drives. However, there is always some error present in the concentricity of the tracks with respect to the disc center and the drive motor spindle center. The non-concentricity error is termed Once Per Revolution (OPR) positional error.

There are two basic methods of writing servo tracks on these drives. The first method is to write the servo tracks in a servo track writer (STW) on each disc individually prior to drive assembly, separate from the disc "pack", and then stacking the discs on the drive motor spindle to assemble the pack and the overall drive. This method requires a separate, single disc servo track writer, into which each disc is placed and written. The second method is to assemble the drive motor onto the drive base plate, the discs onto the drive motor spindle in the drive into a disc "pack", and then insert the partially assembled drive into a "Pack-writer" to write the servo tracks on the discs in the pack. This pack-writer utilizes the drive's actuator assembly to write the tracks and utilizes apertures in the disc drive housing in conjunction with a laser interferometer to index and position the heads or a push pin contact with an external positioner to position the heads during the STW process.

This latter, pack-writing process is an extra step in the drive manufacturing sequence that can be avoided if the servo tracks on the discs are previously written in the single disc STW process. One problem in single disc STW process, however, is the compounding of OPR positional errors which are introduced because of the manufacturing tolerances in the inner diameter dimensions of the disc and the outer diameter tolerances of the drive motor spindle. As each disk is stacked on the drive motor spindle there can be an error in concentricity of the disc with the drive center. Further, during the single disc STW process, there is a dimensional tolerance between the disc inner diameter (ID) and the STW spindle outer diameter (OD). These two different tolerances can introduce compounded error in the concentricity of the written servo tracks with respect to the disc center in the actual disc drive. Further, when several discs written by the single disc STW process are stacked on a drive spindle during drive manufacture, these non-concentricity errors or OPR errors can further compound such that the peak to peak OPR error in the assembled stack can be several mils or more.

The single disc STW uses the STW spindle center as the base reference for determining the track locations. A single disc STW can generate errors in track writing once per revolution (OPR) errors from head to head across 100's of tracks. These errors compound when such written discs are assembled into an actual disc drive. Therefore there is a need for a method for accurately reducing the potential peak to peak OPR errors that can result when single disc STW process is used.

SUMMARY OF THE INVENTION

The method and apparatus in accordance with the present invention addresses the above identified need. The method involves clamping a disc to be written in a single disc servo track writer, sensing the location of an outer edge portion of the disc, measuring a once per revolution position error peak to peak amplitude value and phase value for that disc, determining an average OPR positional error therefrom, and adding this average OPR error to the baseline outer edge dimension to provide the baseline for locating the first written track and each subsequent track recording head position.

This method reduces the written in non-concentricity to the measurement and track writing servo's accuracy. The OPR peak to peak amplitude and phase measurement establishes the disc average circular dimensions in the STW and makes all the STW written tracks concentric with the average dimensions. Then, when the disc is mounted on an actual disc drive spindle, only the tolerance errors between the stacked discs contribute to the OPR positional error of the tracks in the drive.

These and various other features as well as advantages which characterize the present invention will be apparent from a reading of the following detailed description and a review of the associated drawings.

DETAILED DESCRIPTION

Figure 1:
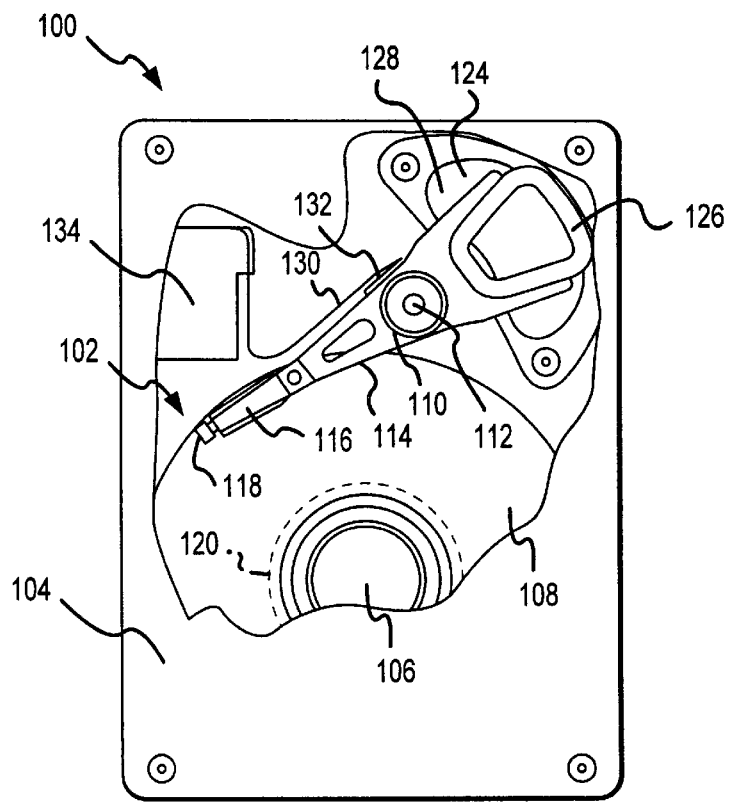
FIG. 1 is a schematic representation of a disc drive written in accordance with a preferred embodiment of the invention.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

The radial position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
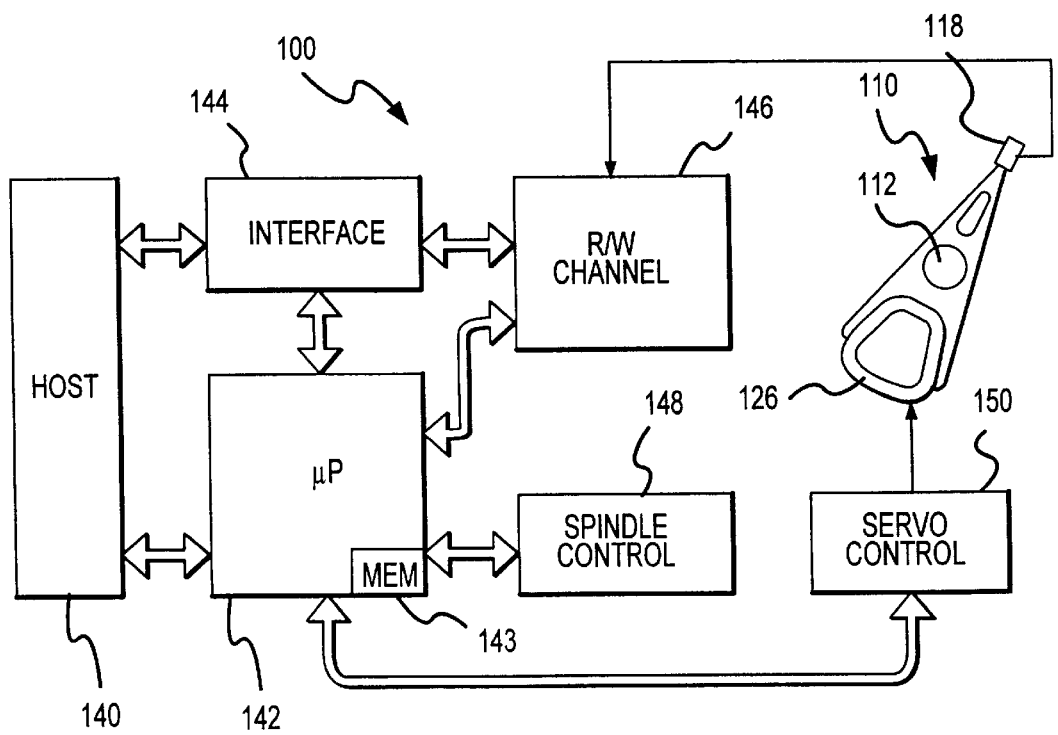
FIG. 2 illustrates a disc drive system connected to a host for the disc drive of FIG. 1.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

Data is transferred between the host computer 140 and the disc drive 100 by way of a disc drive interface 144, which typically includes a buffer to facilitate high speed data transfer between the host computer 140 and the disc drive 100. Data to be written to the disc drive 100 are thus passed from the host computer to the interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host computer 140. Such operations of the disc drive 100 are well known in the art and are discussed, for example, in U.S. Pat. No. 5,276,662 issued Jan. 4, 1994 to Shaver et al.

The discs 108 are rotated at a constant high speed by a spindle control circuit 148, which typically electrically commutates the spindle motor 106 (FIG. 1) through the use of back electromotive force (BEMF) sensing. The radial position of the heads 118 is controlled through the application of current to the coil 126 of the actuator assembly 110. A servo control circuit 150 provides such control.

Figure 3:
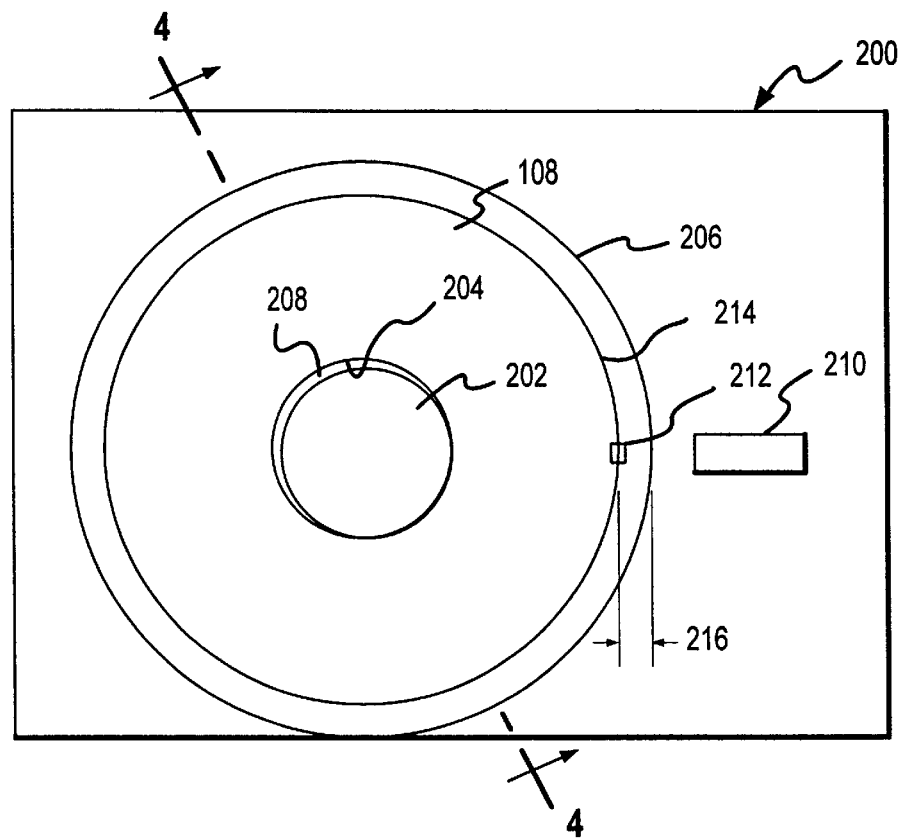
FIG. 3 is a top schematic representation of a disc mounted on the motor hub in a servo track writer in accordance with a preferred embodiment of the present invention.
Figure 4:
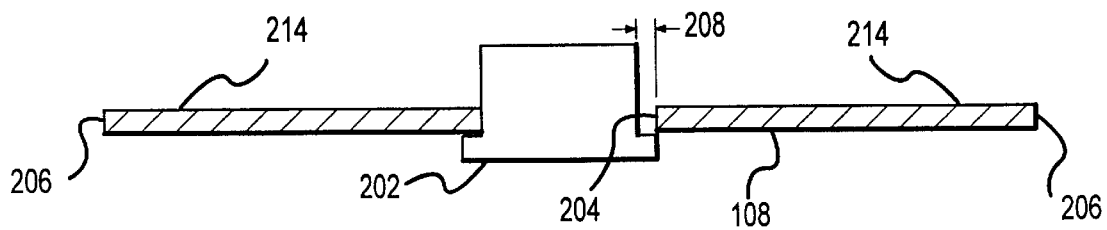
FIG. 4 is a schematic sectional representation of the disc mounted on the motor hub in FIG. 3.

A single disc servo track writer (STW) 200 in accordance with the present invention is schematically shown in a plan view in FIG. 3. The STW 200 has a motor spindle 202 upon which a disc 108 is mounted for rotation and servo track writing. A cross sectional view of the disc 108 on the STW 200 spindle 202 is shown in FIG. 4 illustrating the dimensional error that can arise due to manufacturing tolerance. The disc 108 is an annular flat disc with an inner diameter (ID) aperture edge 204 and an outer diameter (OD) edge 206.

The positioning of the disc 108 on the spindle 202 results in a maximum gap 208 between the spindle 202 outer surface and the ID edge 204 of the disc 108. For example, the gap 208 of permissible error due to manufacture tolerance may be as much as 0.088 mm between the spindle 202 and the inner ID 204 of the disc 108 as shown.

A position measuring device including a sensor such as a capacitance or laser interferometer 210 is positioned adjacent the mounted disc 108 in the STW 200. As the disc 108 is rotated, the interferometer 210 measures the mounted non-concentricity of the disc 108 by measuring the distance from the interferometer 210 to the edge 206 of the disc 108. The peak to peak variation of distance measurement is the edge roughness. The Once Per Revolution (OPR) positional error phase to the edge 206 equates to the relative rotational position of the peak to peak signal. The average OPR positional error and phase are computed. This value, in accordance with the present invention, is then added to the STW servo reference and is utilized as the reference position of the edge 206 for positioning the STW track writing head 212 while writing each of the tracks 214. The dimension 216 in FIG. 3 would thus change by the roughness of the disk edge. The result is that all STW written tracks will be written concentric with the average outer edge dimensions of the disc on the STW. This reduces the positional errors in the servo track writing process simply to the measurement and STW accuracy. For example, present laser interferometers have a 12 bit DAC with 4096 counts times a resolution of between 0.3 to 100 micro-inches. For 4 mils of absolute motion the measurement resolution could be as low as 1 micro-inch. This resolution is well within the normal range of expected thermal OPR positional error changes in an assembled disc pack.

A typical disc has the following dimensional specifications:

Inner diameter (ID)=25 mm+0.05 mm −0.0 mm.

Outer Diameter (OD)=95 mm+0.1 mm −0.1 mm.

Concentricity ID to OD=+0.05 mm.

Using these dimensions, if the ID/OD concentricity is aligned to subtract from the spindle to disk gap 208, the ID to track distance difference is 0.088 mm. The OD to track distance difference is 0.038 mm. Utilizing these same dimensions, if the ID/OD concentricity is aligned to add to the spindle to disk gap 208, the ID to track distance is again 0.088 mm. However, the OD to track distance difference is 0.138 mm.

In contrast, as is shown by the dimensional values in FIG. 4, utilizing the edge STW technique in accordance with the present invention, with the ID/OD concentricity aligned to add to the spindle to disk gap 208, the ID to track distance difference is 0.05 mm. The OD to track distance difference is 0.0 mm.

Figure 5:
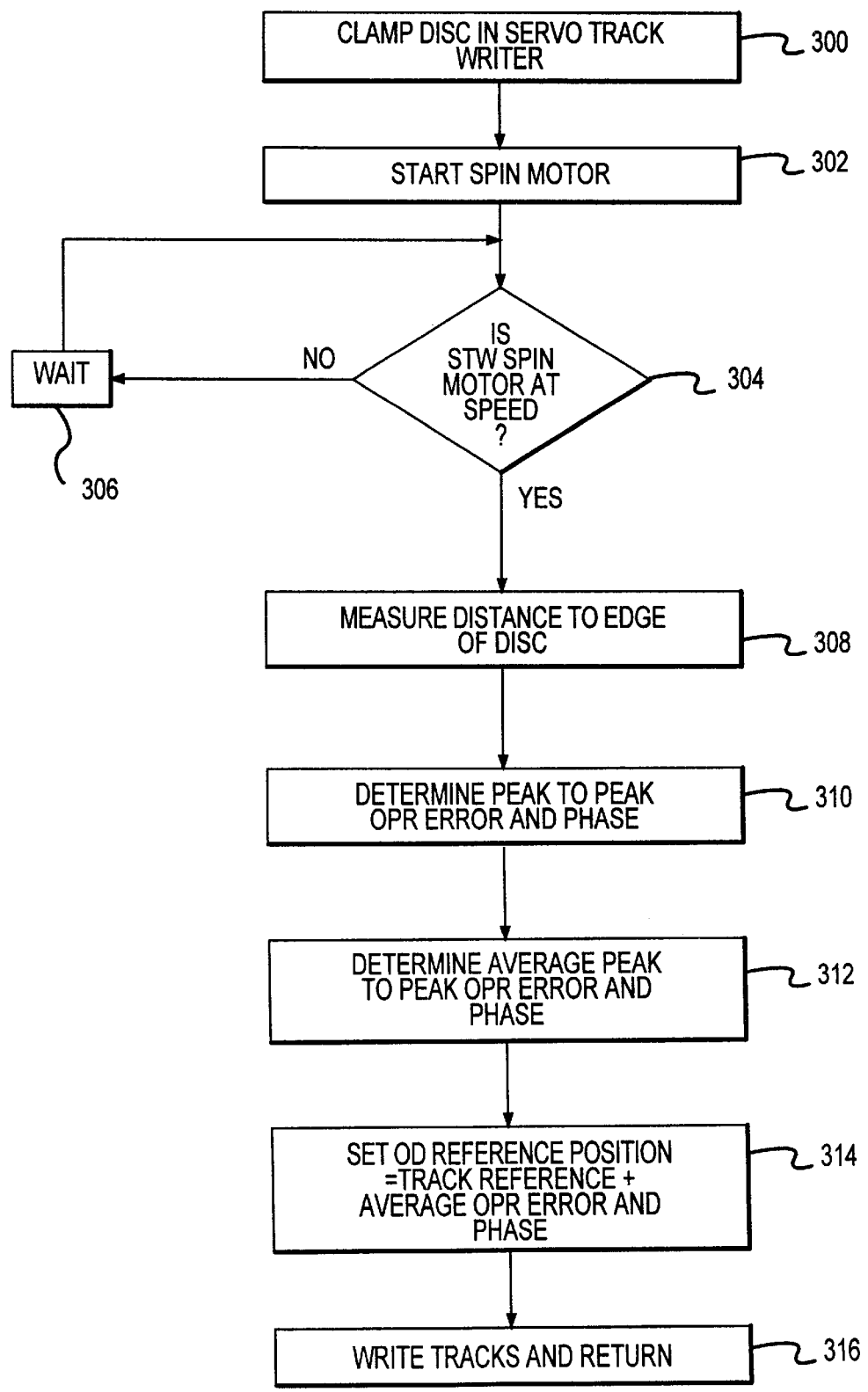
FIG. 5 is a flow diagram of a preferred embodiment of the method in accordance with the present invention

The method in accordance with the present invention may be more readily understood with reference to the STW control software operational steps shown in FIG. 5.

In operation 300 the disc to be written is clamped in the servo track writer 200. Control then transfers to microcomputer operation 302 where the STW spin motor is energized. Control then transfers to query operation 304 in which query is made whether the STW spin motor is at the required speed. If not, control transfers to wait operation 306 and then back to query operation 304. This loop continues until the STW motor is at the required speed. Control then transfers to operation 308.

In operation 308, the interferometer 210 begins measuring the distance to the edge 206 and stores the actual distance at each angular position of the rotating disc until a steady set of measurements has been accumulated. Control then transfers to operation 310 where the peak to peak once per revolution positional error is determined along with the corresponding phase signal. Control then transfers to operation 312 where the STW microcomputer determines the peak to peak average OPR error and phase values for the disc as a whole. Control then transfers to operation 314 where the O D reference position is set equal to the track reference plus the average OPR error and phase value. This modified reference value is then utilized in operation 316 to correctly center and position the write head 212 to write each of the hundreds of tracks on each side of the disc 108.

The result is that all of the written tracks are concentric with the average OPR position error of the disc OD and thus when the discs are subsequently assembled into an actual disc drive 100, the track positional errors are substantially only due to the manufacturing tolerances of the actual drive motor spindle to disc ID dimensions.

To summarize one embodiment of the present invention, once per revolution (OPR) positional errors in a single disk servo track writer (STW) (such as 200) are minimized using the following steps. First, a disc (such as 108) having an outer edge (such as 206) is clamped (such as in operation 300) in the servo track writer. Next, the disc (such as 108) is spun up to a predetermined speed (such as in operations 302 and 304) in the servo track writer (such as 200). Then the distance from the disc edge to a predetermined point is measured (such as in operation 308) to determine peak to peak once per revolution positional error (such as in operation 310). An average once per revolution positional error is then determined (such as in operation 312) from the peak to peak once per revolution positional error signal. Finally, the reference position for writing the servo tracks (such as 214) on the disc (such as 108) is set (such as in operation 314) equal to a predetermined track reference value plus the average once per revolution positional error.

The servo track writer (such as 200) has a distance detector (such as 210) spaced from the disc. The step of measuring (such as in operation 308) may involve sensing a distance signal from the disc edge to the detector location and recording the distance signal at intervals during a disc revolution while the disc is rotating in the servo track writer, and then determining the peak to peak variation in the distance signal (such as in operation 310). The average once per revolution positional error (such as in operation 312) is then calculated from the peak to peak variation in the distance signal. The reference position for writing all of the servo tracks on the disc is then set to a track reference plus the average OPR error and phase (such as in operation 314). The servo tracks are then written based from this reference position (such as in operation 316).

The servo track writer (such as 200) preferably has a microcomputer connected to a spin motor which has a spindle (such as 202) for supporting and rotating a single disc (such as 108) mounted thereon. The STW also has a selectively positionable write head (such as 212) selectively positionable over a surface of the disc mounted on the spindle for writing the servo tracks (such as 214). The STW also has an edge distance measuring device including a sensor (such as 210), for example, a laser interferometer spaced from the spindle (such as 202) in the servo track writer for measuring the distance from the sensor to the outer edge (such as 206) of a disc (such as 108) mounted on the spindle. The measured edge distance signal to the disc is averaged over a revolution of the disc and an average once per revolution positional error and phase is determined therefrom (such as in operation 312). This average error is used to set a reference position (such as in operation 314) for writing servo tracks (such as 214) on the disc (such as 108 and such as in operation 316).

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for minimizing once per revolution (OPR) positional errors in a single disk servo track writer (STW), comprising steps of:
    a) clamping a disc having an outer edge in the servo track writer;
    b) spinning the disc in the STW;
    c) measuring a distance from the outer edge of the disc to a predetermined point to determine peak to peak once per revolution positional error;
    d) determining an average once per revolution positional error from the peak to peak once per revolution positional error; and
    e) setting a reference position for writing servo tracks on the disc as a function of a predetermined track reference plus the average once per revolution positional error.

2. The method according to claim 1 wherein the STW has a distance detector spaced from the disc and the step of measuring step (c) comprises steps of:
    (c)(i) sensing a distance signal from the disc edge to the detector location;
    (c)(ii) recording the distance signal at intervals while the disc is rotating in the STW;
    (c)(iii) determining the peak to peak variation in the distance signal; and
    (c)(iv) calculating the once per revolution positional error from the peak to peak variation in the distance signal.

3. The method according to claim 1 wherein the measuring step (c) comprises measuring distance with an interferometer.

4. The method according to claim 3 wherein the measuring step (c) comprises measuring distance with a laser interferometer.

5. A servo track writer comprising:

a spin motor having a spindle for supporting and rotating a disc mounted thereon;

a write head selectively positionable over a surface of the disc;

an edge distance measuring device spaced from the spindle in the servo track writer measuring a distance from the device to an outer edge of the disc over a revolution of the disc and determining a once per revolution positional error used to set a reference position for writing servo tracks on the disc.

6. The servo track writer according to claim 5 wherein the measuring device comprises an interferometer.

7. The servo track writer according to claim 6 wherein the interferometer is a laser interferometer.

8. The servo track writer according to claim 5 wherein the measuring device determines a peak to peak positional error for the disc on the spindle.

9. The servo track writer according to claim 8 wherein the reference position for writing servo tracks on the disc is determined from an average value of the peak to peak positional error.

10. A servo track writer having a spindle motor for rotating a disc having an outer edge mounted thereon, a write head selectively positionable over a surface of such a disc mounted on the spindle motor, the writer comprising:

a distance sensor spaced from the spindle motor; and means for determining and applying an average once per revolution positional error of the edge to provide a position reference for positioning the write head over the surface of the disc during track writing.

11. A servo track writer comprising:

a spin motor having a spindle supporting and rotating a disc mounted to the spindle; and a once per revolution error measuring device spaced from the spindle in the servo track writer operable to determine a once per revolution positional error used to set a reference position for writing servo tracks on the disc.

12. A servo track writer as defined in claim 11, wherein the measuring device determines a peak to peak once per revolution positional error for the disc on the spindle.

13. A servo track writer as defined in claim 11, wherein the measuring device comprises an interferometer measuring a distance between the interferometer and an outer edge of the disc, wherein the distance is used in determining the once per revolution positional error.

14. A servo track writer as defined in claim 13, wherein the interferometer is a laser interferometer.

* * * * *